June 6, 1972 — M. W. SHANER ET AL — 3,667,857

COMBINED DRILL AND REAMER CONSTRUCTION

Filed Oct. 30, 1970

INVENTORS
MILO W. SHANER, ROBERT S. CAVE
BY
Learman & McCulloch

United States Patent Office 3,667,857
Patented June 6, 1972

---

3,667,857
COMBINED DRILL AND REAMER CONSTRUCTION
Milo W. Shaner, Bridgeport, and Robert S. Cave, Bay City, Mich., assignors to National Twist Drill & Tool Co., Rochester, Mich.
Filed Oct. 30, 1970, Ser. No. 85,625
Int. Cl. B23b 51/08
U.S. Cl. 408—230
13 Claims

ABSTRACT OF THE DISCLOSURE

A rotary cutting tool combining the characteristics of a drill and a reamer has a cylindrical body provided with spade-like drilling edges at one end thereof from which spiraling grooves extend toward the other end to provide helical cutting edges circumferentially spaced from one another by the grooves. Two diametrically opposed grooves are deeper than the remaining grooves, and all grooves spiral in the same direction and at the same pitch. The cutting edges are interrupted by notches spaced longitudinally of the cutting edges to form cutting teeth, the notches spiraling about the tool body in the same direction as the grooves, but at a steeper pitch.

---

The invention disclosed herein relates to rotary tools and more particularly to a tool having the combined characteristics of a drill and a reamer.

It is not uncommon for holes drilled in a workpiece to require subsequent milling or reaming so as to finish the bore wall to the required smoothness. Heretofore, drilling and reaming have required separate operations to be performed, thereby necessitating transfer of a workpiece from a drilling station to a reaming station or the provision of a tool head having both a drill and a reamer supported thereon for sequential presentation to the workpiece. In either case, more time is required to effect two independent operations than would be required if the two operations are combined.

In the drilling of a workpiece by a conventional drill, both the drill and the workpiece become heated thereby causing thermal expansion of the parts, but at different rates because of the differences in the materials constituting the drill and the workpiece. Normally, the workpiece expands at a greater rate than the drill, causing the drilled hole to shrink somewhat following passage of the leading end of the drill. As the drill is withdrawn from the workpiece, usually at a considerably greater rate than that at which it is fed in the drilling operation, the leading end of the drill engages and scores or otherwise mars the surface of the bore formed in the workpiece. A tool constructed in accordance with the invention overcomes the problems of the kind referred to by the provision of a large number of independent, discontinuous cutting teeth on the shank of the tool, each of which performs a cutting function. Due to the discontinuity of the cutting teeth they generate little heat between themselves and the workpiece, thereby permitting the tool and the workpiece to operate at cooler temperatures and, consequently, minimizing thermal expansion of the tool and the workpiece.

An object of this invention is to provide a combination drilling and reaming tool which engables a workpiece to be drilled and reamed in one operation.

Another object of the invention is to provide a drilling and reaming tool which minimizes thermal expansion of both the tool and the workpiece.

A further object of the invention is to provide a combination drilling and reaming tool which facilitates chip removal.

Another object of the invention is to provide a tool of the character referred to which may be ground and reground quite simply without necessitating any special equipment.

A further object of the invention is to provide a combined drilling and reaming tool which operates at temperatures which greatly extend its operating life.

Other objects and advantages of the invention will be pointed out specifically or will become apparent from the following description when it is considered in conjunction with the appended claims and the accomapnying drawings, in which:

Figure 1:
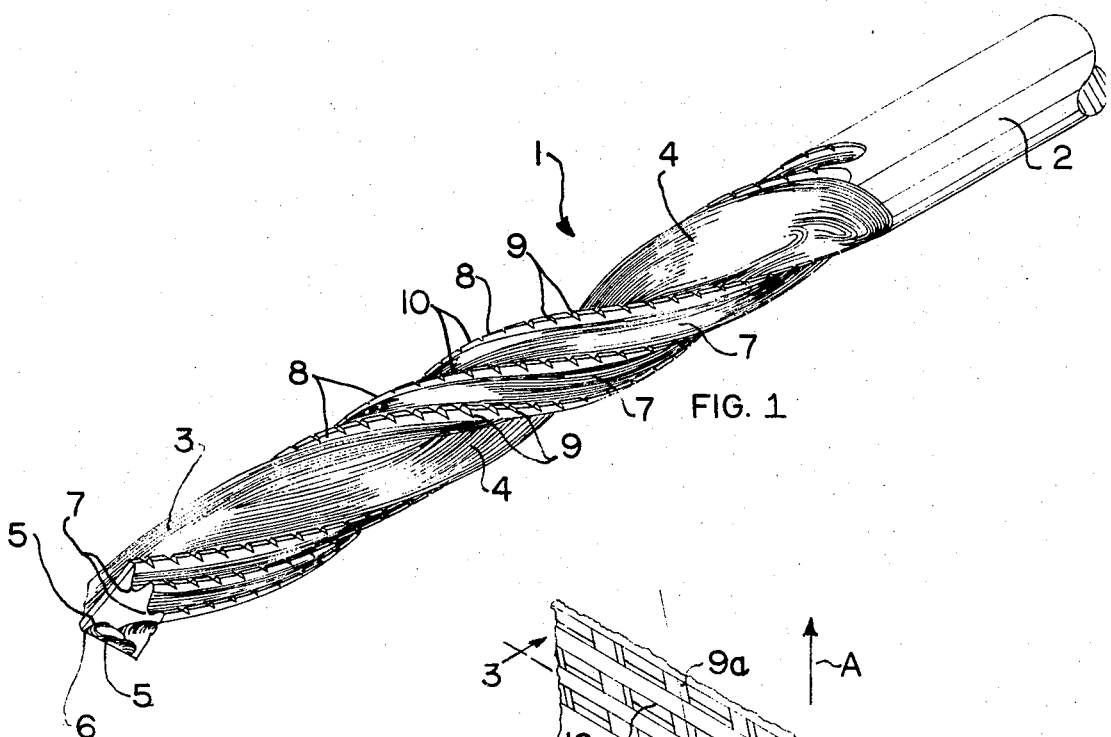
FIG. 1 is a fragmentary, isometric view of a combined drill and reamer constructed in accordance with the invention.

A tool constructed in accordance with the invention comprises a cylindrical body 1 formed of carbide or other suitable material and having a smooth shank 2 at one end. The opposite end of the body 1 constitutes a cutting end 3 having a pair of diametrically opposed, helical grooves or flutes 4 of uniform length, width, and depth which spiral at the same pitch about the axis of the body 1 and merge with grooves 5 at the tip of the cutting end 3 to form conventional drilling edges 6 which taper to the longitudinal axis of the body. Between the grooves 4 are two pairs of helical grooves 7 which spiral from the cutting end 3 toward the opposite end of the body and which spiral in the same direction and at the same pitch as the flutes 4. The pitch of the grooves 4 and 7 may vary in accordance with the pitch variations in conventional drills, and in the disclosed embodiment the pitch of the groove is substantially 30° and is represented by the angle a. The two pairs of grooves 7 are diametrically opposed from one another and are of less width and depth than the width and depth of the flutes 4, but the width and depth of each groove 7 is uniform.

The grooves 4 and 7 form three uniformly spaced cutting edges 8 between which the grooves 4 spiral the axis of the body in the same direction and at the same pitch as the grooves. Since there is a total of six grooves 4 and 7, there is provided a total of six cutting edges 8.

Figure 2:
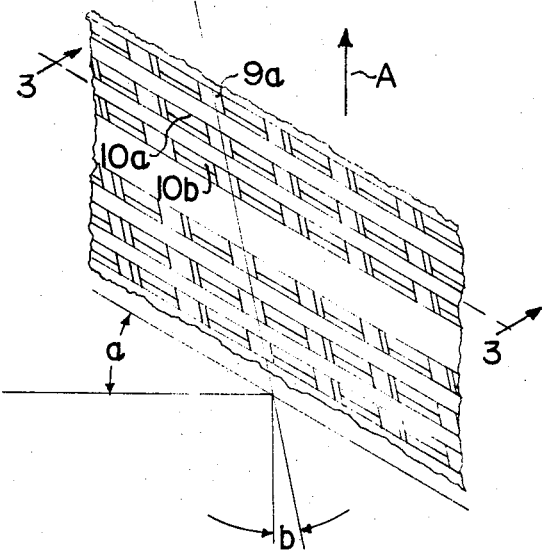
FIG. 2 is a fragmentary, developed plan view illustrating the cutting edges, grooves, notches, and cutting teeth.

Each of the cutting edges 8 is interrupted longitudinally of the body at spaced intervals by notches 9 formed by a groove which spirals about the axis of the body 1 in the same direction as the grooves 4 and 7, but at a steeper pitch. The pitch of the notch-forming groove may vary, as will be pointed out hereinafter, but in the disclosed embodiment the pitch of such groove is about 79°. The reciprocal of the pitch angle of 79° is 11° and is represented in FIG. 2 as the angle b. The notches 9 provide on each of the cutting edges 8 a plurality of longitudinally spaced apart, flat surface cutting teeth 10.

Figure 4:
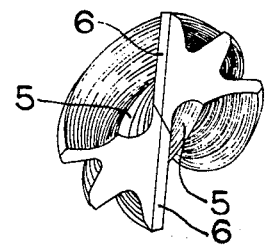
FIG. 4 is an enlarged, end elevational view of the drilling end of the tool.
Figure 3:
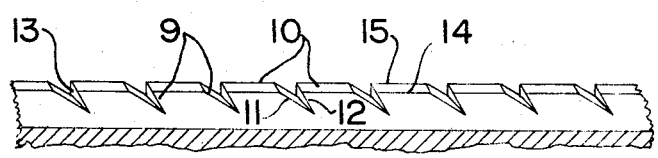
FIG. 3 is a fragmentary, sectional view taken on the line 3—3 of FIG. 2.

The grooving tool which forms the notches 6 preferably has a surface which imparts to each notch a V-shaped configuration, as is best shown in FIG. 3, having axially leading and trailing walls or sides 11 and 12, respectively, the leading side 11 being inclined at a lesser angle to the longitudinal axis of the body 1 than is the trailing side 12, thereby enabling the axially leading edge of each tooth 10 to overhang slightly the notch 9 so as to constitute a cutting edge. Each tooth 10 is relieved circumferentially, as at 14, so as to enable the circumferentially leading edge 15 of each tooth also to function as a cutting edge when the tool is rotated counterclockwise, as viewed in FIG. 4.

As has been pointed out, the pitch of the cutting teeth 10 is about 79° in the disclosed embodiment so as to provide a specific number of teeth 10 per inch of length of the tool. The number of cutting teeth, the length of each tooth, and the length of each notch 9 of a given tool will depend upon several factors. In general, the greater the diameter of the body 1, the greater the number of notches and, consequently, the greater the number of cutting teeth that can be provided. The greater the number of notches, the greater can be the pitch of the notch-forming grooves. In practice, however, the axial length of each notch 9 should be no greater than the length of each tooth 10. Preferably each tooth 10 is about twice as long as the length of each notch 9.

The helix on which the notches 9 are formed and the lengths of the notches 9 and the teeth 10 should be so selected that the circumferentially adjacent teeth on successive cutting edges are offset axially from one another by an amount such that each circumferentially successive tooth has a portion which follows a portion of a notch in a preceding cutting edge. The amount of offset between successive teeth should be such that, for each complete revolution of the body 1, the teeth trailing any given notch will more than offset the length of the notch. This characteristic of the construction is best illustrated in FIG. 2 wherein one of the notches is identified by the reference character 9a and succeeding teeth are indicated by the reference characters 10a and 10b. If the tool is moved in the direction of the arrow A the right-hand end of the tooth 10a will follow a portion of the path traversed by the groove 9a, the right-hand end of the tooth 10b will follow another portion of the path traversed by the notch 9a, and so on, thereby assuring that the entire length of the path traversed by the notch 9a will be followed by some portion of each succeeding cutting teeth.

The length of each tooth 10, the length of each notch 9, and the number of such teeth and notches formed in each cutting edge will depend on the number of cutting edges which, in turn, depends on the diameter of the body 1. In general, however, the greater the diameter of the body, the greater number of cutting edges can be provided between the grooves 4 and, consequently, the greater the number of notches and cutting teeth that can be provided.

The depth of the notches 9 also is related to the diameter of the body 1 and to the number of cutting edges 8 formed thereon. In general, the greater the number of cutting edges 8, the greater can be the depth of the grooves 7, inasmuch as a relatively larger diameter body is sufficiently resistant to deflection to enable each cutting tooth to remove a relatively larger, predetermined maximum amount of material from a workpiece. The depth of each notch, however, should be greater than the depth of the cut of the cutting teeth 10 thereby assuring the formation of discontinuous chips.

A tool constructed in accordance with the invention is utilized in the same manner as a conventional drill, but has certain, definite advantages over the latter. For example, the provision of the cutting teeth 10, each of which has an axial cutting surface and a circumferential cutting surface, assures a reaming of a hole bored in a workpiece as the tool is advanced through the workpiece. Moreover, the discontinuous cutting teeth 10 assures the formation of discontinuous chips, thereby facilitating chip removal, and the spiraling of the notches 9 in the same direction as the flutes 4 further facilitates chip removal.

In addition, the discontinuous cutting teeth 10 impose less drag or resistance to rotation of the tool when it is in operative engagement with a workpiece, thereby reducing deflection and twisting of the tool and permitting cutting of the workpiece to closer tolerances than otherwise would be possible. Further, the utilization of a relatively large number of cutting edges enables the tool to operate at a relatively low temperature, thereby minimizing its thermal expansion and increasing tool life. Moreover, the large number of cutting teeth, their being offset from one another axially of the body 1, coupled with the minimization of deflection and twisting of the tool, make it possible for the tool to provide a workpiece with a finish which eliminates the necessity of subsequent reaming.

When the cutting teeth 10 become dull and need to be reground, they may be reground in the same manner as conventional reamers. Should the regrinding of the cutting teeth result in an effective reduction in the depth of the notches 9, it is a simple matter to grind the notches to a greater depth, thereby producing a reground tool having the same characteristics as the original tool, except for a slightly smaller diameter.

The disclosed embodiment is representative of the presently preferred form of the invention, but is intended to be illustrative rather than definitive thereof. The invention is defined in the claims.

We claim:

1. A cutting tool comprising a body having a plurality of cutting edges spiraling in one direction from one end of said body toward its other end, said cutting edges being circumferentially spaced from one another by grooves spiraling in the same direction and at the same pitch as said edges, at least one of said grooves being deeper than the others of said grooves, each of said cutting edges being interrupted longitudinally of said body by a plurality of notches to form a plurality of teeth on each edge, said notches spiraling about said body in the same direction as said edges and said grooves but at a steeper pitch.

2. A tool according to claim 1 wherein said one end of said body has cutting edges formed thereon and tapering to the longitudinal axis of said body.

3. The construction set forth in claim 1 wherein said one of said grooves is substantially wider circumferentially of said body than the others of said grooves.

4. A tool according to claim 1 wherein the pitch of said notches is such that the teeth on adjacent edges are offset axially of said body, the amount of said offset being such that the path traversed to each notch is traversed by a plurality of successive teeth.

5. A tool according to claim 1 wherein each of said edges between two adjacent notches is flat.

6. A tool according to claim 1 wherein each of said notches has an axially leading wall and an axially trailing wall, both of which are inclined to the longitudinal axis of said body, said axialy leading wall being less inclined than said axially trailing wall.

7. A tool according to claim 1 wherein the length of each of said teeth is greater than the length of each of said notches.

8. A tool according to claim 1 wherein each of said teeth is relieved on one side.

9. A tool according to claim 1 wherein each of said notches has a depth such that chips cut by said teeth are discontinuous.

10. A tool according to claim 1 wherein the steepness of the pitch of said notches is directly proportional to the number of cutting edges on said body.

11. A tool according to claim 10 wherein the cutting edges of said body are relieved on one side.

12. A cutting tool comprising a cylindrical body having a plurality of cutting edges spiraling in one direction from one end of said body toward its other end, said cutting edges being circumferentially spaced from one another by grooves spiraling in the same direction and at the same pitch as said edges, two of said grooves being of greater depth than the others of said grooves and being diametrically opposed from one another, said two of said grooves being circumferentially wider than the others of said grooves, each of said cutting edges being interrupted longitudinally of said body by a plurality of notches to form a plurality of teeth on each edge, said notches spiraling about said body and in the same direction as said notches and said grooves but at a steeper pitch.

13. A tool according to claim 12 wherein the others of said grooves are of uniform width and depth.

References Cited

UNITED STATES PATENTS

| 2,918,955 | 12/1959 | Simas | 48—230 |
| 3,058,199 | 10/1962 | Cave et al. | 408—230 |
| 3,147,646 | 9/1964 | Rawcliffe | 408—230 |

GERALD A. DOST, Primary Examiner

U.S. Cl. X.R.

408—241